United States Patent
Zanden et al.

(10) Patent No.: US 10,613,327 B2
(45) Date of Patent: Apr. 7, 2020

(54) COMPACT HEAD-UP DISPLAY THAT INCLUDES A FLAT LENS WITH A STRUCTURED PATTERN

(71) Applicant: SAAB AB, Linkoeping (SE)

(72) Inventors: Johan Zanden, Norrahammar (SE); Anna-Karin Holmer, Joenkoeping (SE); Stefan Andersson, Habo (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/461,855

(22) PCT Filed: Nov. 25, 2016

(86) PCT No.: PCT/SE2016/051171
§ 371 (c)(1),
(2) Date: May 17, 2019

(87) PCT Pub. No.: WO2018/097774
PCT Pub. Date: May 31, 2018

(65) Prior Publication Data
US 2019/0339518 A1   Nov. 7, 2019

(51) Int. Cl.
*G02B 27/01* (2006.01)
*B64D 45/00* (2006.01)
*G02B 3/08* (2006.01)

(52) U.S. Cl.
CPC .......... *G02B 27/0101* (2013.01); *B64D 45/00* (2013.01); *G02B 3/08* (2013.01);
(Continued)

(58) Field of Classification Search
CPC ...... G02B 3/08; G02B 27/0101; G02B 27/01; G02B 27/0149; G02B 2027/013; G02B 2027/015
(Continued)

(56) References Cited

U.S. PATENT DOCUMENTS 5,313,326 A * 5/1994 Ramsbottom ...... G02B 27/0101
                                            359/631
9,766,456 B2 * 9/2017 Christmas ............ G03H 1/0808
(Continued)

FOREIGN PATENT DOCUMENTS

EP       0535876 A1    4/1993
WO   WO-2016/014712 A1    1/2016

OTHER PUBLICATIONS

International Searching Authority, International Search Report and Written Opinion, for International Application No. PCT/SE2016/051171, dated Aug. 21, 2017, 10 pages, Swedish Patent and Trademark Office, Sweden.

*Primary Examiner* — William R Alexander
(74) *Attorney, Agent, or Firm* — Alston & Bird LLP

(57) ABSTRACT

A stabilization arrangement (10) for stabilizing an antenna mast (3), comprising an antenna mast (3) and a gyroscopic stabilizer device (12), wherein the gyroscopic stabilizer device (12) in turn comprises a flywheel (11), a flywheel axis (14), wherein the flywheel (11) is arranged about the flywheel axis (14), and a gimbal structure (13), wherein the flywheel (11) is suspended in the gimbal structure (13) and the gimbal structure (13) is configured to permit flywheel precession or tilting about at least one gimbal output axis (16). The gyroscopic stabilizer device (12) is fixedly arranged in connection to a first end portion (31) of the antenna mast (3) and the antenna mast (3) is fastenable to a supporting structure at a second end portion (32) of the antenna mast (3), wherein the gyroscopic stabilizer device (12) is configured to reduce movements in a plane perpendicular to the extension of the antenna mast (3).

18 Claims, 5 Drawing Sheets

(52) U.S. Cl.
CPC .... *G02B 27/0149* (2013.01); *G02B 2027/013* (2013.01); *G02B 2027/015* (2013.01)

(58) Field of Classification Search
USPC ........................................................ 359/631
See application file for complete search history.

(56) References Cited

U.S. PATENT DOCUMENTS

| | | | | |
|---|---|---|---|---|
| 9,823,471 | B2* | 11/2017 | Kim | G02B 27/0101 |
| 10,031,403 | B2* | 7/2018 | Piehler | G03B 21/14 |
| 10,223,985 | B2* | 3/2019 | Staton | E06B 9/24 |
| 2008/0186587 | A1* | 8/2008 | Matsushita | G02B 27/0101 |
| | | | | 359/630 |
| 2011/0292346 | A1* | 12/2011 | Fok | G02B 27/0101 |
| | | | | 353/13 |
| 2016/0025973 | A1* | 1/2016 | Guttag | G02B 27/0101 |
| | | | | 345/7 |
| 2016/0223814 | A1* | 8/2016 | Lin | G02B 27/0101 |
| 2016/0282616 | A1* | 9/2016 | Matsushita | G02B 27/0101 |
| 2017/0038583 | A1* | 2/2017 | Kim | G02B 27/0101 |
| 2017/0261746 | A1* | 9/2017 | Tam | G02B 27/0101 |
| 2018/0182314 | A1* | 6/2018 | Staton | A61G 11/00 |

\* cited by examiner

COMPACT HEAD-UP DISPLAY THAT INCLUDES A FLAT LENS WITH A STRUCTURED PATTERN

CROSS REFERENCE TO RELATED APPLICATIONS

This application is a National Stage Application, filed under 35 U.S.C. 371, of International Application No. PCT/SE2016/051171, filed Nov. 25, 2016; the contents of which is hereby incorporated by reference in its entirety.

BACKGROUND

Related Field

The present disclosure relates to a head-up display. The present disclosure further relates to airborne vehicles comprising head-up displays.

Description of Related Art

Head-up displays, HUD, are often used in vehicles, such as airborne vehicles and land-borne vehicles, for presenting information to an operator of the vehicle in such a way that the operator simultaneously is able to see the surrounding of the vehicle through a window. The information is preferably also shown at the same (virtual) image distance as the viewing distance to the surroundings. Thus no or only very little eye moving is needed for between looking at the presented information and looking at the surrounding. The operator can also fast detect changes in the surrounding when looking at presented information, or vice versa.

HUD are, however, often quite space-consuming. This can be understood as follows. The presented information reaches the eye(s) of a user of the HUD via light beams. These light beams originate from an image source and have to pass optical components on the way from the image source to the eye(s). Even if there were usable transparent image sources, these could usually not be used directly, since the image also preferably has to appear to be at a reasonably far distance, comparable to the viewing distance to the surrounding outside world. The light beams from the image source thus have to pass the optical components for focusing and/or defocusing of the image, magnification and/or demagnification of the image, changing of the direction of the light beams, or the like. There is thus usually quite some space needed in between the optical components since the distance between the components is determined by the focal length of lenses, and/or the focal length of convex or concave mirrors, or any other optical parameters. Also, especially for an off axis solution, where the optical combiner is not flat and the combiner is tilted relative to the optical axis so that the reflected light is directed away from the incident light, a large number of optical surfaces are required to adequately correct for the optical aberrations. This not only gives a larger space envelope, but also a large weight.

On the other hand, more and more devices are added to vehicles. Since the total size of the vehicle usually should not increase, there is thus a need to build more compact HUDs which require less space.

BRIEF SUMMARY

It is an objective of the present disclosure to present a more compact design for a HUD.

It is an objective of the present disclosure to present an alternative design for a HUD.

A solution to the objectives is partially allowed by the development of new manufacturing technologies, e.g. for free-form surfaces.

At least some of the objectives are achieved by a head-up-display, HUD. The HUD is arranged to project an image to at least one eye of a user of the HUD. The HUD comprises an image source. The HUD further comprises an optical component. The optical component comprises at least one free-form surface. The optical component is arranged in an optical path between the image source and the intended position of said at least one eye of the user of the HUD. The HUD further comprises a flat lens comprising a structured lens pattern on at least one of its surfaces. The structured lens pattern has a feature size in the order of 10 μm up to 10 mm. The flat lens is arranged in the optical path between the image source and the intended position of said at least one eye of the user of the HUD. The HUD further comprises a combiner. At least one surface of the combiner is a free-form surface. The combiner is arranged in the optical path between the optical component and the intended position of said at least one eye of the user of the HUD.

This has the advantage that a compact design is achieved. The flat lens and the free-form surfaces allow aberrating and/or blurring the image in unconventional ways and to compensate this aberration and/or blurring again so that a "right" image is projected at the eye of the observer. The free-form surfaces and the flat lens add additional degrees of freedom to the design of a HUD. These additional degrees of freedom can then be used to skip further lenses, mirrors, prisms, and/or other optical components. All this allows reducing space constraints of the HUD.

In one embodiment, the image source is arranged to provide the image to be projected via a curved image plane, or generally via a non-planar image plane. This has the advantage that an even more compact design can be achieved.

In one embodiment of the HUD the image source is arranged to provide the image via the curved image plane in the optical path before the optical component and the flat lens. This allows having the curved image plane close to the image source, thus allowing a compact design of the light source and its surrounding.

In one embodiment the HUD further comprises a fibre-optic faceplate. The curved image plane is provided via the faceplate. This allows a compact solution for providing the curved image plane. The number of components for achieving a curved image plane is reduced.

In one embodiment the image source comprises a curved display. The curved image plane is provided via the curved display. This requires no extra components for achieving a curved image plane, thus allowing having an even more compact design with few optical surfaces/components.

In one embodiment the flat lens is arranged in the optical path between the image source and the optical component. This allows using a smaller flat lens, thus reducing weight.

In one embodiment the flat lens is arranged in the optical path between the optical component and the combiner. This allows for a better possibility to change the flat lens and/or to inspect the flat lens for damages. The flat lens can also partly function as a beam direction turning device. This can also make the design more compact.

In one embodiment the flat lens is attached to the optical component. This allows for a robust design, especially when the HUD is subjected to vibrations.

In one embodiment the flat lens is arranged at a distance from the optical component. This is advantageous in case the flat lens and the optical component have different coefficients of thermal expansion.

In one embodiment the flat lens is curved. This allows for more design options, for example integrating the flat lens with the optical component.

In one embodiment a smooth surface of the flat lens is oriented towards the optical component. This allows an easy attaching.

In one embodiment a smooth surface of the flat lens is oriented away from the optical component. This allows protecting the structured lens pattern from dust and other deposits. This also protects the structured lens pattern from scratching or the like.

In one embodiment no light beam redirecting optical components such as lenses, mirrors, and/or prisms are arranged in the optical path between the combiner and the intended position of said at least one eye of the observer. By keeping down the number of elements between the eye of the observer and the surrounding the HUD will create a less disturbing influence to a user of the HUD.

In one embodiment the HUD does not comprise any further light beam redirecting optical components. This keeps space requirements low. Further, this increases stable operation of the HUD as each additional component would potentially add a risk for misalignment.

In one embodiment the feature size has a height which is in the order of 10 μm up to 1 mm. This reduces the risk for "shadowed" areas in the flat lens.

In one embodiment the HUD is arranged to be used in an airborne vehicle, such as an airplane. Especially for airplanes space and weight savings due to a compact design will easily pay off by saved operational and constructional costs.

In one embodiment the flat lens and the optical component are integrated into a single component made of the same material.

At least some of the objectives are achieved by an airborne vehicle, such as an airplane, comprising a HUD according to the present disclosure. Especially for airplanes space and weight savings due to a compact design of the HUD will easily pay off by saved operational and constructional costs.

BRIEF DESCRIPTION OF THE FIGURES

For a more detailed understanding of the present invention and its objects and advantages, reference is made to the following detailed description which should be read together with the accompanying drawings. Same reference numbers refer to same components in the different figures. In the following, FIG. 1 schematically depicts a vehicle according to the present disclosure.

DETAILED DESCRIPTION OF VARIOUS EMBODIMENTS

Here, and in the whole document, the term "free-form" refers to a surface which is neither plane nor spherical.

Here, and in the whole documents, the term "oriented" refers to an orientation in relation to a light path. Thus, an orientation of one object in relation to another object does not necessarily relate to a direct physical orientation between these objects, but rather to an orientation considering a light path is followed. However, a direct physical orientation and an orientation in relation to the light path can coincide as will become obvious from the drawings.

Figure 1:
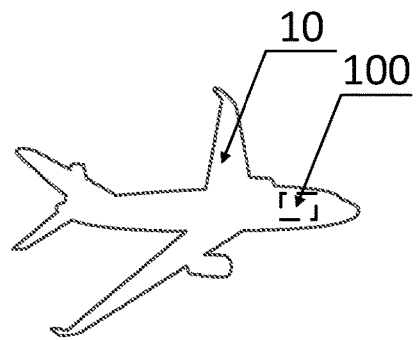

FIG. 1 schematically depicts a vehicle 10 according to the present disclosure. In the shown example the vehicle 10 is an airborne vehicle, more specifically an airplane. The airplane can be a passenger plane or a military plane. The airplane can be of any size, such as a one-, or two-seated airplane, or an airplane for many passengers and/or freight transport. The airborne vehicle can, however, be any other kind of airborne vehicle as well, such as helicopters, dirigibles, or the like. The vehicle 10 comprises a head-up display, HUD, 100 which will be described in more detail in relation to FIG. 2. Although the vehicle 10 is depicted as an airborne vehicle, the vehicle can in principle be any other kind of vehicle as well, such as land-borne or sea-borne vehicles.

FIG. 2*a-f* schematically depict cross-sections of different embodiments of a HUD 100 according to the present disclosure. Throughout the figures, same reference numbers describe the same elements. Not every element is described in detail in relation to every embodiment. Instead, it can in general be assumed that elements without further description in one embodiment possess the same functions and properties as have been described in relation to a corresponding previous embodiment. In all embodiments an eye 180 of an observer is depicted. The HUD 100 is arranged to provide an image to the eye 180 of the observer when the eye 180 of the observer is situated at a pre-determined position. Said pre-determined position does not have to be a single pre-determined position but can in principle be a certain three-dimensional space in which the eye of the observer should be placed. In one example the HUD 100 is arranged to provide said image to one eye of the observer. In one example the HUD 100 is arranged to provide said image to both eyes of the observer. In the following the description refers for simplicity to one eye, but it should be understood that this equally applies to the case where the HUD 100 is used for two eyes.

The eye 180 of the observer has a line of sight 110. When being in the pre-determined position and looking at the line of sight 110, the eye 180 of the observer will be able to see a surrounding, such as a surrounding of the vehicle. This is achieved by light from the surrounding reaching the eye 180 of the observer.

The image which is provided by the HUD 100 is in a preferred example directed to the eye 180 of the observer, where it might be projected on the retina of the eye.

It should also be understood that the HUD 100 in general can comprise further elements as those depicted in the figures, such as elements for holding the different components at a given position, cables for data and/or power supply, or the like. However, components which do not affect the appearance of the image which is provided by the HUD have been removed from the FIG. 2*a-f*.

The HUD 100 comprises a combiner 140. The combiner 140 comprises a first surface 141. The first surface 141 is oriented towards the eye 180 of the observer. The combiner 140 comprises a second surface 142. The second surface 142 is oriented away from the eye 180 of the observer. The combiner is preferably semi-transparent. Light from the surrounding can reach the eye 180 of the observer via first passing the second surface 142 of the combiner 140 and then the first surface 141 of the combiner. At least one of the first and the second surfaces 141, 142 of the combiner 140 are free-form surfaces. In other words, that surface is neither plane nor spherical. Instead, the form of the surface can be described by a polynomial function or equation, as long as this polynomial function or equation does not describe a plane or spherical surface, or can be described by any other function or equation. The combiner is arranged in the optical path between an optical component 160 and the intended position of said at least one eye of the user of the HUD.

Figure 2A:
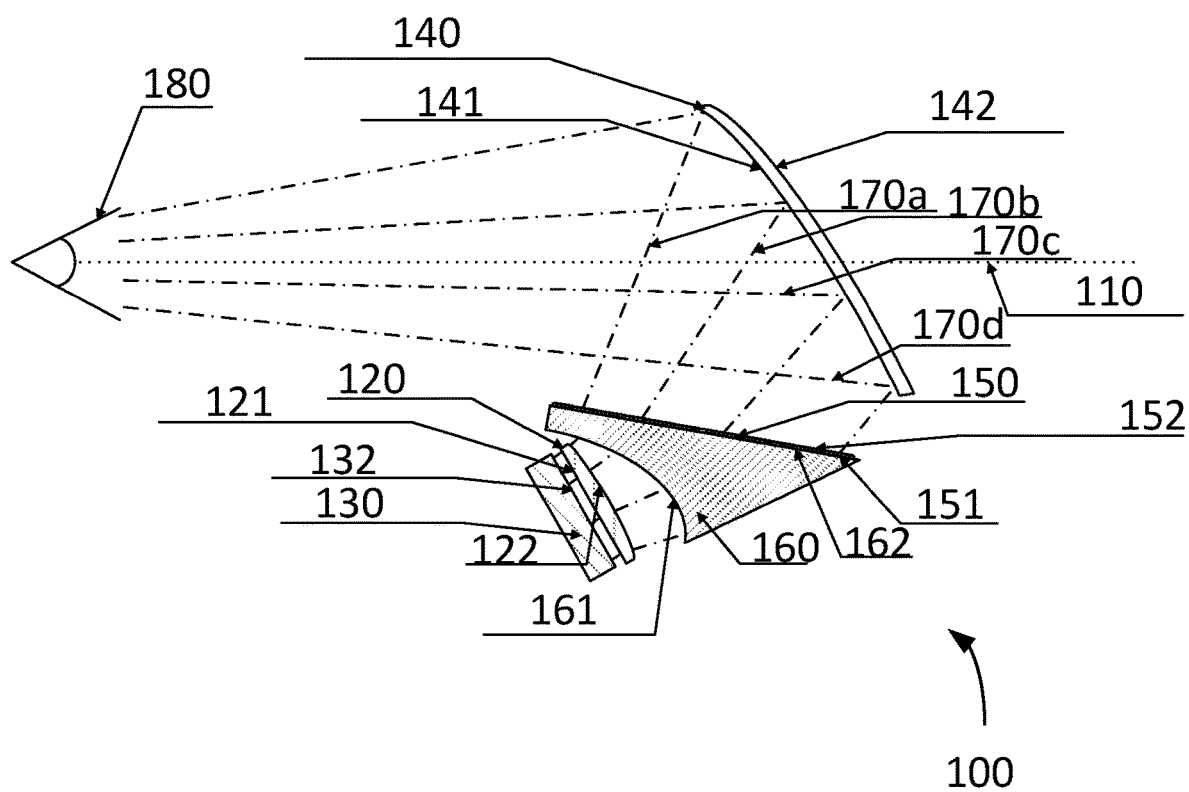
FIG. 2*a-f* schematically depict different embodiments of a HUD according to the present disclosure.

FIG. 2a schematically depicts a cross-section of a first embodiment of the HUD 100. The HUD comprises an image source 130. The image source 130 comprises a first surface 132. The image source is arranged to emit light via the first surface 132. The image source 130 can be a display arrangement. The display arrangement can comprise a liquid crystal display, LCD, and/or a display based on light emitting diodes, LED. Said display based on LED can be a display based on organic LED, OLED. Even any other display type could be used. The image source 130 can be a projector arrangement.

The HUD 100 can comprise a fibreoptic faceplate 120. The faceplate 120 comprises a first surface 121. The first surface is preferably oriented towards the image source 130. The faceplate comprises a second surface 122. The second surface 122 is preferably oriented away from the image source 130. In case the image source 130 comprises a projector arrangement, the projector arrangement can be arranged to project the image on the first surface 121 of the faceplate 120. In one example there is a distance between the first surface 132 of the image source 130 and the first surface 121 of the faceplate 120. Such a distance is depicted in the embodiment of FIG. 2a. Said distance is especially preferred in case the image source 130 comprises a projector arrangement. However, a distance can also be present in case no projector arrangement is present.

The second surface 122 of the faceplate 120 can be a curved surface. This allows providing the image from the image source 130 via a curved image plane. In this case the curved image plane corresponds preferably to the curved second surface 122 of the faceplate. In one example the first surface 121 of the faceplate 120 is plane surface and the image "enters" the faceplate in a plane image via the first surface 121 of the faceplate 120.

The HUD further comprises an optical component 160. The optical component 160 comprises a first surface 161. The first surface is oriented towards the image source 130. The optical component comprises a second surface 162. The second surface 162 is oriented towards the eye of an observer. At least one of the first and the second surface 161, 162 of the optical component 160 is a free-form surface. The optical component 160 is arranged to affect a change of direction of propagation for light beams entering the optical component from the image source 130. Said change of direction is preferably performed for basically any light beam entering the optical component from the image source 130. The optical component 160 is arranged in the optical path between the image source and the intended position of the eye of the user of the HUD. The optical component preferably has an index of refraction which differs from the index of refraction of air and/or vacuum. The optical component 160 can be made out of glass and/or plastic. The optical component 160 is preferably transparent. The form of the optical component is further described in relation to FIG. 3a-d and FIG. 4a-c.

The HUD 100 further comprises a flat lens 150. The flat lens 150 comprises a first surface 151. Said first surface 151 is preferably an even, i.e. a smooth surface. The flat lens 150 comprises a second surface 152. Said second surface preferably comprises a structured lens pattern. The structured lens pattern has preferably a feature size in the order of 10 µm up to 10 mm. In one example said feature size is in the order of 10 µm up to 1 mm. In one example said feature size is in the order of 10 µm up to 100 µm. The structured lens pattern is further explained in relation to FIG. 5. The term "flat" does relate to the fact that the average distance between the first and the second surface 151, 152 of the flat lens 150 does not vary substantially throughout the extension of the first and second surface 151, 152, i.e., for example, that the average distance between the first and the second surface 151, 152 in the middle of the lens is not significantly different from the average distance between the first and the second surface 151, 152 in the side regions of the lens. In this relation the average distance should be taken over the extension of one or a few features when seeing them in a cross section such as in FIG. 2a-f. Thus the term flat does neither demand that the first and second surface 151, 152 should be a straight line, nor that the first and second surface 151, 152 should be even, i.e. completely plane. Instead the term flat relates to the fact that the lens is "flattened" in relation to a conventional lens. An example of a "flattened" lens which is well-known in the art is a Fresnel lens. The flat lens 150 is arranged in the optical path between the image source 130 and the intended position of the eye 180 of the user of the HUD. In the shown example, the flat lens 150 is arranged in the optical path between the optical component 160 and the combiner 140.

In the example of FIG. 2a the first surface 151 of the flat lens 150 is adjacent to the second surface 162 of the optical component 160. The first surface 151 of the flat lens 150 can be fixedly attached to the second surface 162 of the optical component 160. The first surface 151 of the flat lens 150 can also be integrated with the optical component 160 if the flat lens 150 and the optical component 160 are of the same material. Thus, they could be manufactured as one component, e.g. by moulding. This has the advantage that the internal relation between the optical component 160 and the flat lens 150 and thus the beam travelling between these components remains constant even under tough conditions, such as strong shakings of the HUD. In one example one or several intermediate layers are arranged between the optical component 160 and the flat lens 150.

What has been described regarding the image source 130, the faceplate 120, the flat lens 150 and the optical component 160 in relation to the first embodiment applies equally to all other embodiments as long as not explicitly described or depicted differently in relation to these embodiments.

Figure 2B:
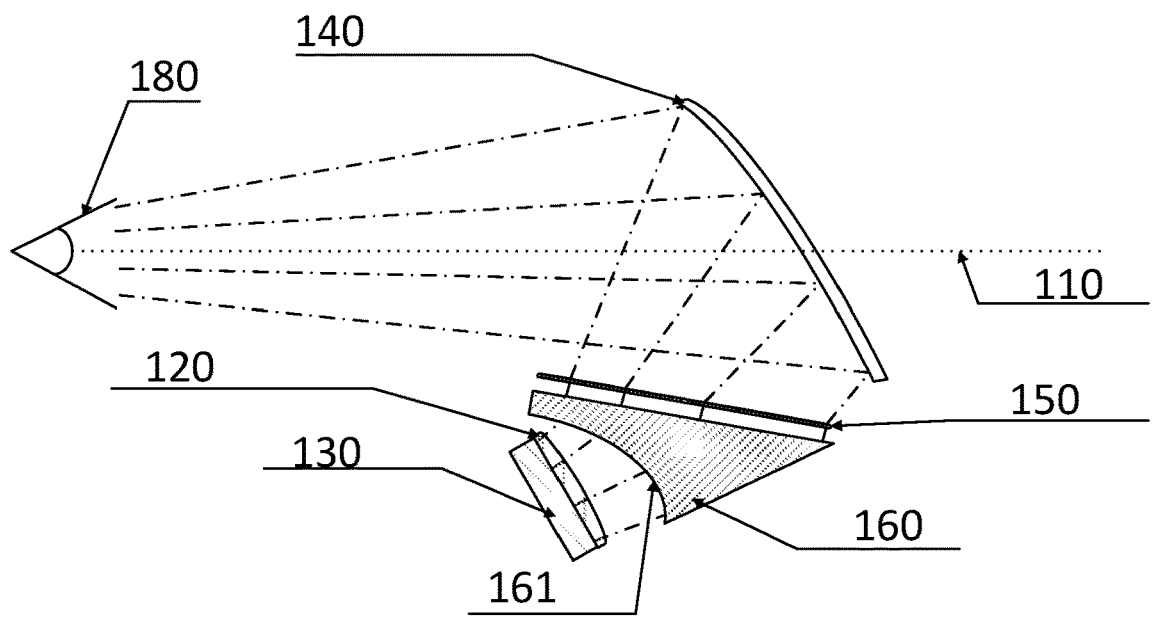

FIG. 2b schematically depicts a cross-section of a second embodiment of the HUD 100. One difference between the first and the second embodiment is that the first surface 121 of the faceplate 120 is attached to the first surface 132 of the image source. This is advantageous in case the image source comprises a display. In that way a compact arrangement can be achieved as no air slit is needed between the image source 130 and the faceplate 120. The light leaving a pixel of the display will then be emitted into a bunch of fibres in the faceplate. Different pixels will emit the light into different bunches of fibres. By this it will than appear as if the image which is emitted by the image source 130 is emitted by the faceplate 120 instead.

Instead of a direct attachment between faceplate 120 and image source 130, one or several intermediate layers could be used in between the faceplate 120 and the image source 130. These one or several layers are preferably quite thin, especially thin in comparison to the thickness of the faceplate 120.

In the second embodiment, the flat lens 150 is not directly attached to the optical component 160. Instead, an air slit, or a slit of any other, preferably non-solid, material is arranged between the optical component 160 and the flat lens 150. This is especially advantageous in case the optical component 160 and the flat lens 150 have different coefficients of thermal expansion. Since, especially on airborne vehicles, quite large temperature changes can occur during short times the slit can prevent the occurrence of too high tensions between the flat lens 150 and the optical component 160.

Figure 2C:
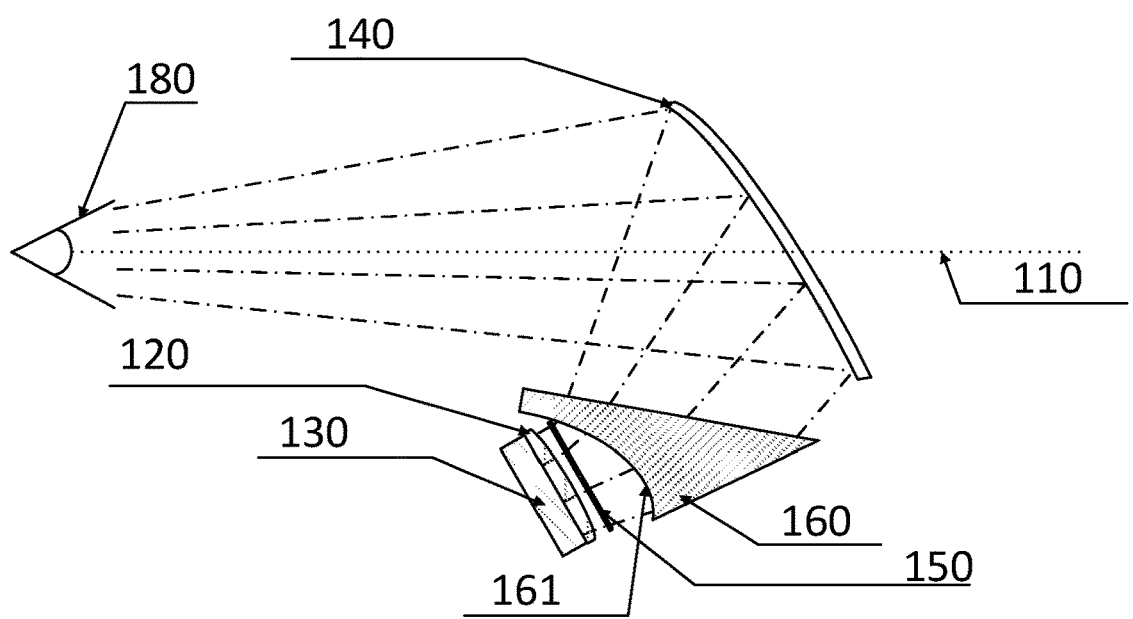

FIG. 2c depicts a third embodiment of the HUD according to the present disclosure. In this embodiment the flat lens 150 is situated in the optical path between the image source 130 and the optical component 160. This has the advantage that the flat lens 150 can be made smaller compared to the first or second embodiment. This is due to the fact that the flat lens 150 does not need to extend to a length which approximately corresponds to the second surface 162 of the optical component 160. In the shown embodiment the surface of the flat lens comprising the structured lens pattern is oriented towards the optical component 160.

Figure 2D:
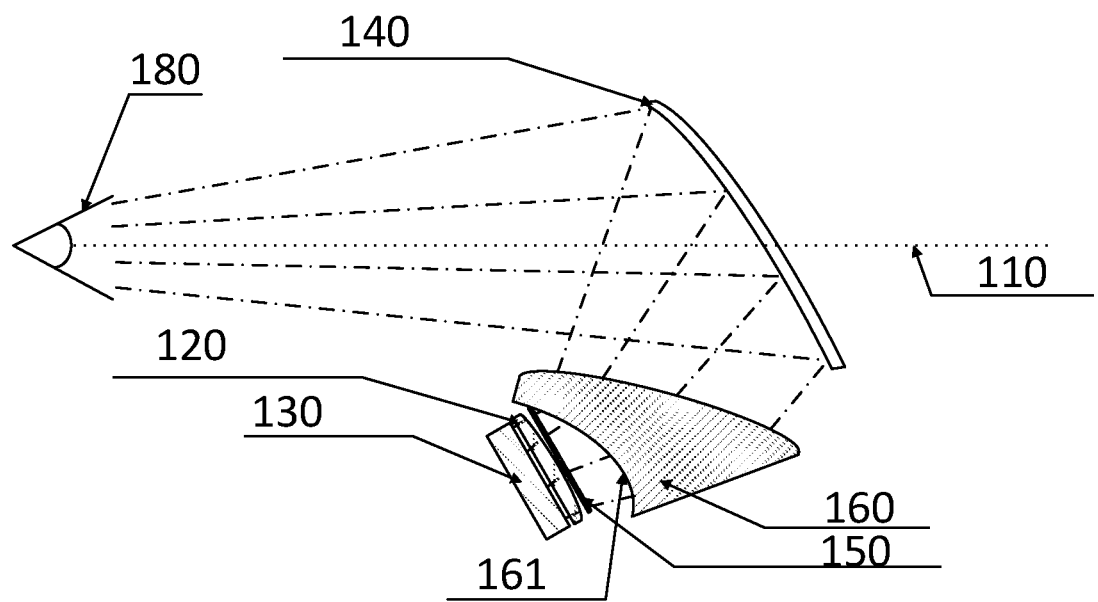

FIG. 2d depicts a fourth embodiment of the HUD according to the present disclosure. In this embodiment the second surface 162 of the optical component 160 is convex. This is in comparison to the previous embodiments wherein the second surface 162 of the optical component 160 could be seen as a straight line when seen in a cross-section. The flat lens 150 is arranged in the optical path between the image source 130 and the optical component 160. In an alternative embodiment, the flat lens 150 is arranged on the second surface 162 of the optical component 160. Thus the flat lens 150 can be curved.

Figure 2E:
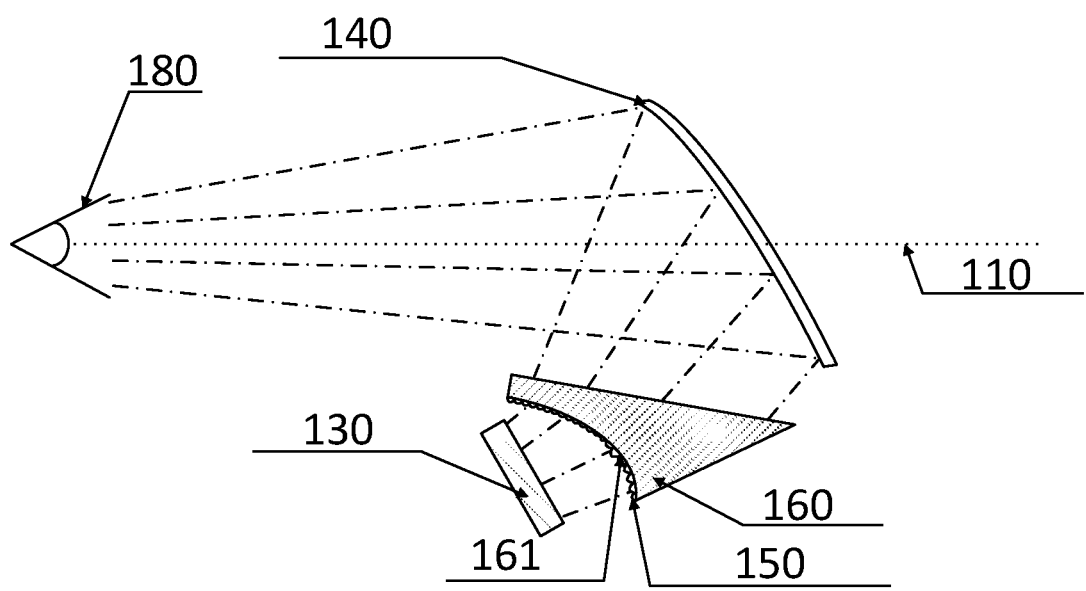

FIG. 2e depicts a fifth embodiment of the HUD according to the present disclosure. In this embodiment the flat lens 150 is curved. The flat lens 150 is arranged at the first surface 161 of the optical component 160. The flat lens 150 and the optical component 160 can be arranged as the same component. As an example, the flat lens can be machined directly on the first surface of the optical component. This has the advantage that one less component is needed.

In the shown example one side of the flat lens has the same form as the free-form side of the optical component.

In the shown example no faceplate 120 is present. In another example a small slit is provided between the image source 130 and the face plate 120. This might be advantageous in case a direct attachment would risk produce too much tensions between these elements. Further, this might simplify replacing the image source in an easy way.

Figure 2F:
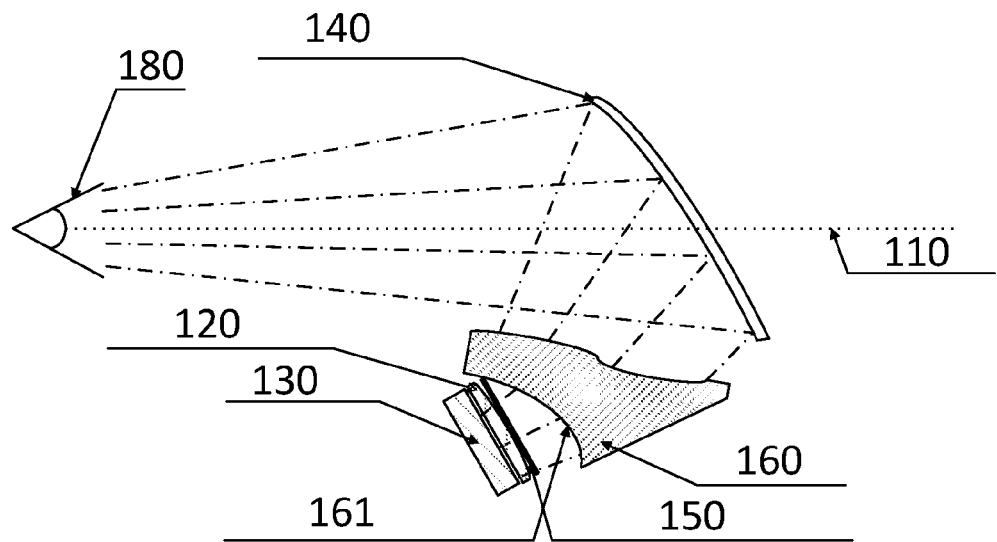
Figure 3A:
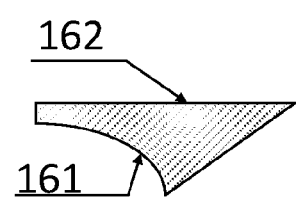
FIG. 3*a-d* schematically depict cross sections of different embodiments of an optical component which can be used in accordance with the present disclosure.
Figure 3B:
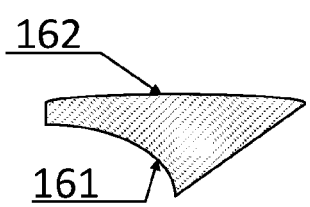
Figure 3C:
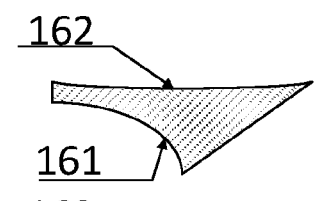
Figure 3D:
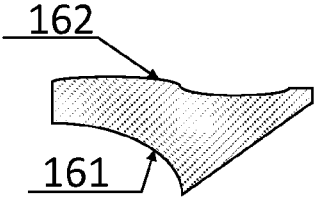

FIG. 2f a sixth embodiment of the HUD according to the present disclosure is depicted. In this example the second surface 162 of the optical material is a free-form surface. The flat lens 150 is situated in the optical path between the image source 130 and the optical component 160. The flat lens 150 is situated in the optical path between the faceplate 120 and the optical component 160. In an alternative embodiment the flat lens 150 is integrated with the faceplate. As an example the flat lens 150 is integrated with the second surface 122 of the faceplate 120. In another example no faceplate 120 is present in the sixth embodiment.

In all embodiments examples of light beams 170a-170d are depicted to show in a schematic way how light beams emitted from the image source 130 can travel through the HUD to the eye of the observer. These examples of light beams 170a-170d are only for illustrative purposes for containing a better understanding of the relation and arrangement of the components of the HUD. In reality, the exact direction of light beams might differ from those depicted in FIG. 2a-f.

In one embodiment (not shown in the figures) no faceplate is needed. This can for example be achieved via having a curved first surface 132 of the image source 130. A curved first surface 132 of the image source 130 allows directly providing the image to be projected via a curved image plane. A curved display surface with or without a faceplate 130 can be combined with any of the shown embodiments in FIG. 2a-f. The curved image plane does not necessarily need to be coupled to a physical element. In one example, the curved image plane is, so to say, "in the air".

In the depicted examples the flat lens 150 is oriented in such a way that the smooth surface is closer to another component, such as the optical material 160 or the faceplate 120, than the surface with the structured lens pattern. In another example, the smooth surface of the flat lens 150 is oriented away from the optical material 160 and/or the faceplate 120. As an example, in FIG. 2a the flat lens 150 could be arranged in such a way that the surface with the structured lens pattern is oriented towards the second surface 162 of the optical material 160. This has the advantage that the surface with the structured lens pattern is better protected from damages and/or deposits.

The curved image plane is preferably provided in the optical path before the optical component 160 and before the flat lens 150. In the foregoing some surfaces have been described as being free-form. However, in a further embodiment any other surface can be free-form as well as long as the requirements according to the independent claims still can be fulfilled.

The depicted six embodiments have been chosen to explain different advantages of different arrangements within the idea of the present disclosure. However, different aspects from the discussed embodiments can be easily combined to arrive at even further embodiments.

It should be emphasized that FIG. 2a-f is a cross section. It is by no means intended that the described elements just continue straight "in to the paper" or "out from the paper" when thinking of a three-dimensional representation. On the contrary, one or several of the discussed components can contain a complex surface structure when cutting them in a direction perpendicular to the cross section shown in FIG. 2a-f. This is for example further discussed in relation to FIG. 4.

FIG. 3a-d schematically depict cross sections of different embodiments of the optical component 160. The cross sections can be in the same direction as the cross sections in FIG. 2a-f. In all shown embodiments the first surface 161 of the optical component is a free-form surface. In the first embodiment depicted in FIG. 3a the second surface 162 of the optical component is an even surface. In the second embodiment depicted in FIG. 3b the second surface 162 of the optical component is a spherical convex surface. In the third embodiment depicted in FIG. 3c the second surface 162 of the optical component is a spherical concave surface. In the fourth embodiment depicted in FIG. 3d the second surface 162 of the optical component is a free-form surface.

The examples of free-form surfaces in connection to this disclosure are only examples. In general, a free-form surface can look different from those depicted in the figures.

Producing an optical component with at least one free-form surface is generally harder than producing components with only plane and/or spherical surfaces. However, by using techniques such as computerized numerical control, CNC, diamond turning, stepper machines, application of floating polymers, hardening via UV-light and/or heat, and/or relating techniques, it is possible to produce the optical component 160, the flat lens 150, and/or other components with free-form optics.

Figure 4:
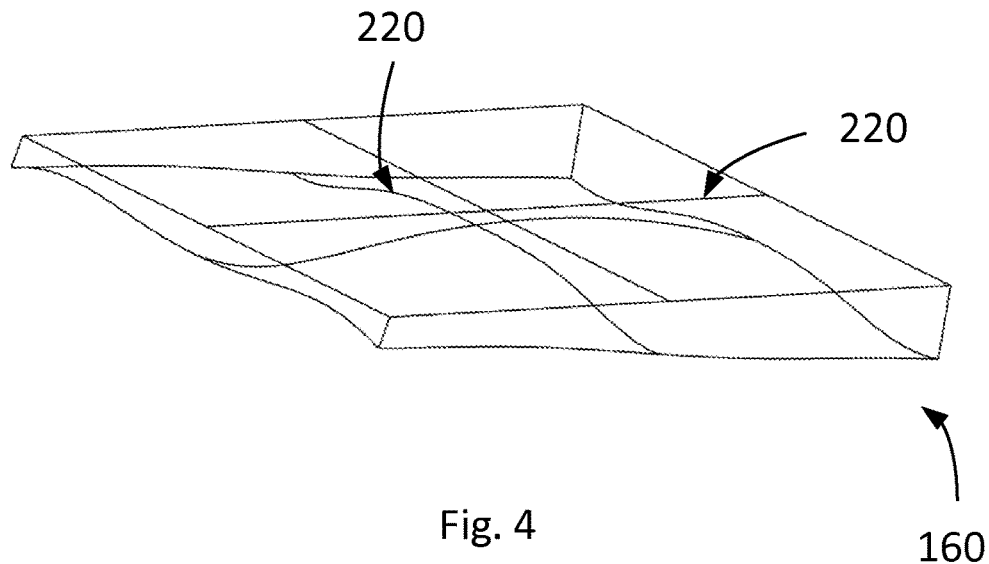
FIG. 4 schematically depicts a perspective view of an embodiment of an optical component which can be used in accordance with the present disclosure.

FIG. 4 schematically depicts a perspective view of an embodiment of the optical component 160. Two grids 220 are shown. The two grids are placed on opposite sides of the optical component. The lines of the grids 220 follow the surface structure of the optical component 160. As can be seen, the optical component can have a complex structure even in the direction perpendicular to the cross-section shown in FIG. 2a-f. As can be seen from FIG. 2a-f the light originating from the image source can due to the optical component 160 be spread to a bigger area when arriving at the combiner. By having a non-trivial structure in the direction perpendicular to the cross-section shown in FIG. 2a-f, this effect of spreading the light beams over a bigger area can also be achieved in the direction perpendicular to the cross-section shown in FIG. 2a-f. This further reduces space requirements, especially in relation to the image source 130, the optional faceplate 120 and the needed space between these elements and the optical component 160.

Figure 5:
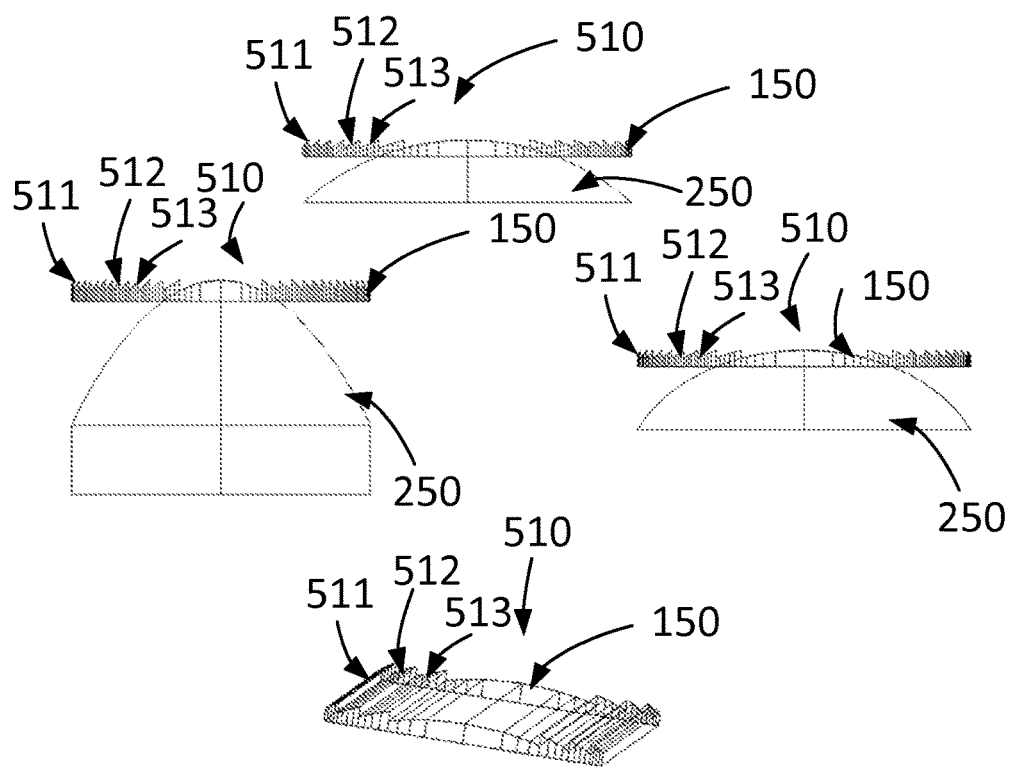
FIG. 5 depicts an example of a cross-section of a flat lens according to the present disclosure.

FIG. 5 depicts several different examples of cross-sections of the flat lens 150. In the shown examples the flat lens 150 is a Fresnel lens. In one example the flat lens 150 is a "flattened" cylindrical lens (lowest image, shown in perspective view). In one example (not shown) the flat lens 150 is a "flattened" elliptical lens. In one example the flat lens 150 is a "flattened" aspherical lens. This is depicted in the two middle images which show two different "flattened" aspherical lenses. At the image at the top a "flattened" spherical lens is depicted. The flat lens 150 can have different focal lengths in one cross-sectional plane and a perpendicular cross-sectional plane. For comparison, the "non-flattened" versions 250 of the lenses are depicted for three of the four images.

When arranged in the HUD, the flat lens 150 can be decentralized. In other words, the middle of the lens does not necessarily have to coincide with the middle of the light beams which are emitted from the light source 130 and transferred to the eye 180. As an example, when looking at FIG. 2a, the flat lens 150 could be shifted to the left or to the right in relation to the optical component 160.

One surface of the flat lens comprises a structured lens pattern 510. The lens pattern 510 consists of different features 511, 512, 513, . . . . The features of the lens pattern 510 in general have a feature size in the order of 10 µm up to 10 mm. In one example all features of the lens pattern 510 have a height of the feature size in the order of 10 µm up to 10 mm. In one example basically all features of the lens pattern 510 have a height of the feature size in the order of 10 µm up to 10 mm. In one example most of the features of the lens pattern 510 have a height of the feature size in the order of 10 µm up to 10 mm. In one example the flat lens is a micro-pattern lens. In one example all or basically all heights of the features are smaller than 1 mm. In one example most of the heights of the features are smaller than 1 mm. In one example all or basically all heights of the features are smaller than 100 µm. In one example most of the heights of the features are smaller than 100 µm. In one example all or basically all heights of the features are bigger than 100 µm. In one example most heights of the features are bigger than 100 µm. What has been said regarding the height also applies regarding the width of the features. It should, however, be understood that at least at one point, for example in the centre of the flat lens, a width of more than 10 mm might be present. This can be seen in FIG. 5.

Advantages of bigger feature sizes are that they can be produced more easily. However, depending on the design of the features, bigger feature sizes might produce shadowed areas. Smaller feature sizes might be harder to produce, but allow on the other side a lens with less thickness. Further, small feature sizes allow more optical aberration correction which can be used for achieving an even more compact design.

Some of the features of the flat lens 150 can have a diffractive effect to light beams. Thus the flat lens 150 can be a hybrid lens, i.e. a lens comprising refractive and diffractive properties. This allows for even more compact designs.

An advantage of a HUD according to the present disclosure is that no further optical components are needed. Especially, no further mirrors or lenses are needed for building up the HUD. Also, the elements of the HUD are not constrained to be positioned in such a way that further image planes are provided in the optical path. A distorted image can be emitted from the image source. The image only needs to look "right" in the eye 180 and not at any point before the eye. A drawback might be that the design process of the HUD becomes more complicated as it demands considerable computational power and/or advanced software to assure that a "right" image is seen by the eye. However, a considerably advantage is that a more compact arrangement will be achieved instead. The introduction of the free-form surfaces, the curved image plane after the image source and the flat lens allow using fewer surfaces to accomplish the required aberration corrections.

It should be understood that the HUD according to the present disclosure can comprise further components such as protection layers or the like. However, such additional components do in general not significantly redirect light beams originating from the image source and being intended for the eye of the observer. Thus said further components are in general no light beam redirecting optical components, such as lenses, prisms, mirrors, or the like.

The foregoing description of the preferred embodiments of the present disclosure is provided for illustrative and descriptive purposes. It is neither intended to be exhaustive, nor to limit the disclosure to the variants described. Many modifications and variations will obviously suggest themselves to one skilled in the art. The embodiments have been chosen and described in order to best explain the principles of the disclosure and their practical applications and thereby make it possible for one skilled in the art to understand the disclosure for different embodiments and with the various modifications appropriate to the intended use.

The invention claimed is:

1. A head-up-display (100), HUD, arranged to project an image to at least one eye (180) of a user of the HUD, comprising:
   an image source (130);
   an optical component (160), comprising at least one free-form surface (161), wherein the optical component (160) is arranged in an optical path between the image source (130) and the intended position of said at least one eye (180) of the user of the HUD;

a flat lens (150) comprising a structured lens pattern (510) on at least one of its surfaces (152), wherein the structured lens pattern (510) has a feature (511, 512, 513, . . . ) size in the order of 10 μm up to 10 mm, wherein the flat lens (150) is arranged in the optical path between the image source (130) and the intended position of said at least one eye (180) of the user of the HUD;

a combiner (140), wherein at least one surface (141, 142) of the combiner (140) is a free-form surface, and wherein the combiner (140) is arranged in the optical path between the optical component (160) and the intended position of said at least one eye (180) of the user of the HUD, wherein the image source (130) is arranged to provide said image via a curved image plane in the optical path before said optical component (160) and said flat lens (150).

2. The HUD according to claim 1 wherein said flat lens (150) is arranged in the optical path between the image source (130) and the optical component (160).

3. The HUD according to claim 1, wherein the flat lens (150) is arranged at a distance from the optical component (160).

4. The HUD according to claim 1, wherein the flat lens (150) is curved.

5. The HUD according to claim 1, wherein a smooth surface (151) of the flat lens (150) is oriented towards the optical component (160).

6. The HUD according to claim 1, wherein a smooth surface (151) of the flat lens is oriented away from the optical component (160).

7. The HUD according to claim 1, wherein no light beam redirecting optical components such as lenses, mirrors, and/or prisms are arranged in the optical path between the combiner and the intended position of said at least one eye of the observer.

8. The HUD according to claim 1, not comprising any further light beam redirecting optical components.

9. The HUD according to claim 1, wherein said feature size has a height which is in the order of 10 μm up to 1 mm.

10. The HUD according to claim 1, wherein the HUD (100) is arranged to be used in an airborne vehicle (10), such as an airplane.

11. An airborne vehicle (10), such as an airplane, comprising a HUD (100) according to claim 1.

12. A head-up-display (100), HUD, arranged to project an image to at least one eye (180) of a user of the HUD, comprising:

an image source (130);
an optical component (160), comprising at least one free-form surface (161), wherein the optical component (160) is arranged in an optical path between the image source (130) and the intended position of said at least one eye (180) of the user of the HUD;
a flat lens (150) comprising a structured lens pattern (510) on at least one of its surfaces (152), wherein the structured lens pattern (510) has a feature (511, 512, 513, . . . ) size in the order of 10 μm up to 10 mm, wherein the flat lens (150) is arranged in the optical path between the image source (130) and the intended position of said at least one eye (180) of the user of the HUD;
a combiner (140), wherein at least one surface (141, 142) of the combiner (140) is a freeform surface, and wherein the combiner (140) is arranged in the optical path between the optical component (160) and the intended position of said at least one eye (180) of the user of the HUD wherein said image source (130) is arranged to provide the image to be projected via a curved image plane and further comprising a fibreoptic faceplate (120), wherein said curved image plane is provided via said faceplate (120).

13. The HUD according to claim 12, wherein said image source (130) is arranged to provide the image to be projected via a curved image plane.

14. The HUD according to claim 12, wherein the image source (130) is arranged to provide said image via said curved image plane in the optical path before said optical component (160) and said flat lens (150).

15. The HUD according to-claim 12, wherein said image source (130) comprises a curved display and wherein said curved image plane is provided via said curved display.

16. A head-up-display (100), HUD, arranged to project an image to at least one eye (180) of a user of the HUD, comprising:

an image source (130);
an optical component (160), comprising at least one free-form surface (161), wherein the optical component (160) is arranged in an optical path between the image source (130) and the intended position of said at least one eye (180) of the user of the HUD;
a flat lens (150) comprising a structured lens pattern (510) on at least one of its surfaces (152), wherein the structured lens pattern (510) has a feature (511, 512, 513, . . . ) size in the order of 10 μm up to 10 mm, wherein the flat lens (150) is arranged in the optical path between the image source (130) and the intended position of said at least one eye (180) of the user of the HUD;
a combiner (140), wherein at least one surface (141, 142) of the combiner (140) is a freeform surface, and wherein the combiner (140) is arranged in the optical path between the optical component (160) and the intended position of said at least one eye (180) of the user of the HUD wherein said flat lens (150) is arranged in the optical path between the optical component (160) and the combiner (140).

17. A head-up-display (100), HUD, arranged to project an image to at least one eye (180) of a user of the HUD, comprising:

an image source (130);
an optical component (160), comprising at least one free-form surface (161), wherein the optical component (160) is arranged in an optical path between the image source (130) and the intended position of said at least one eye (180) of the user of the HUD;
a flat lens (150) comprising a structured lens pattern (510) on at least one of its surfaces (152), wherein the structured lens pattern (510) has a feature (511, 512, 513, . . . ) size in the order of 10 μm up to 10 mm, wherein the flat lens (150) is arranged in the optical path between the image source (130) and the intended position of said at least one eye (180) of the user of the HUD;
a combiner (140), wherein at least one surface (141, 142) of the combiner (140) is a freeform surface, and wherein the combiner (140) is arranged in the optical path between the optical component (160) and the intended position of said at least one eye (180) of the user of the HUD, wherein the flat lens (150) is attached to the optical component (160).

18. A head-up-display (100), HUD, arranged to project an image to at least one eye (180) of a user of the HUD, comprising:
- an image source (130);
- an optical component (160), comprising at least one free-form surface (161), wherein the optical component (160) is arranged in an optical path between the image source (130) and the intended position of said at least one eye (180) of the user of the HUD;
- a flat lens (150) comprising a structured lens pattern (510) on at least one of its surfaces (152), wherein the structured lens pattern (510) has a feature (511, 512, 513, . . . ) size in the order of 10 µm up to 10 mm, wherein the flat lens (150) is arranged in the optical path between the image source (130) and the intended position of said at least one eye (180) of the user of the HUD;
- a combiner (140), wherein at least one surface (141, 142) of the combiner (140) is a freeform surface, and wherein the combiner (140) is arranged in the optical path between the optical component (160) and the intended position of said at least one eye (180) of the user of the HUD,
- wherein said flat lens (150) and said optical component (160) are integrated into a single component made of the same material.

* * * * *

UNITED STATES PATENT AND TRADEMARK OFFICE
CERTIFICATE OF CORRECTION

PATENT NO.        : 10,613,327 B2
APPLICATION NO.   : 16/461855
DATED             : April 7, 2020
INVENTOR(S)       : Zanden et al.

It is certified that error appears in the above-identified patent and that said Letters Patent is hereby corrected as shown below:

In the Claims

Column 12
Line 16, Claim 15: "to-claim" should read --to claim--

Signed and Sealed this
Second Day of June, 2020

Andrei Iancu
*Director of the United States Patent and Trademark Office*